United States Patent Office 3,450,678
Patented June 17, 1969

3,450,678
POLYMERIZATION OF AROMATIC AMINO DICARBOXYLIC ACID ANHYDRIDES
Fulton F. Rogers, Jr., Graylyn Crest, Wilmington, Del., assignor to E. I. du Pont de Nemours and Company, Wilmington, Del., a corporation of Delaware
No Drawing. Filed Mar. 9, 1966, Ser. No. 532,886
Int. Cl. C08g 20/32
U.S. Cl. 260—78     10 Claims

ABSTRACT OF THE DISCLOSURE

Method for making polyamide-acids of over 2000 molecular weight by reacting with itself 4-aminophthalic anhydride, suitably with an acid catalyst, the resulting products being useful film forming agents.

---

This invention relates to polymerization processes and more particularly to such processes useful to prepare polyamide-acids and polyimides.

According to the present invention, one or more free amino dicarboxylic acid anhydrides of benzene or naphthalene is reacted with itself, in an inert organic solvent, at a temperature and for a time sufficient to form a polyamide-acid of the AB type consisting essentially of recurring units of the structure (1)

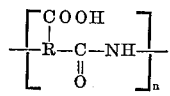

where R is an aromatic nucleus selected from the group consisting of (a) a single aromatic ring and (b) two fused aromatic rings, i.e. derived from benzene or naphthalene, the two indicated carbonyl groups being on adjacent carbons of the R nucleus, and $n$ is a positive integer sufficient to provide a polymer having a molecular weight of at least 2000 and preferably at least 3000. The R group can optionally be substituted with 1 through 3 substituents which can be the same or different and which are selected from the group consisting of fluoralkyl of 1 through 4 carbons, phenyl, chlorine and fluorine.

The use of the free amino anhydrides is advantageous in that highly concentrated solutions can be prepared for polymerization. At high concentrations the polymerization will be faster and will give a product of significantly higher inherent viscosity.

Illustrative of the amino dicarboxylic acid anhydrides are 4-aminophthalic anhydride, 3-aminophthalic anhydride, 4-aminonaphthalene-1,2-dicarboxylic anhydride, 5-aminonaphthalene-1,2-dicarboxylic anhydride, 6-aminonaphthalene-1,2-dicarboxylic anhydride, 7-aminonaphthalene-1,2-dicarboxylic anhydride, 8-aminonaphthalene-1,2-dicarboxylic anhydride, 5-aminonaphthalene-2,3-dicarboxylic anhydride, 6-aminonaphthalene-2,3-dicarboxylic anhydride, etc.

It has been found that such anhydrides are not as reactive as would have been expected and it is unnecessary to protect them from premature condensation by the use of hindering groups. As illustrated below, they can be used in a highly purified form.

The self-condensation of the anhydride monomer in the solvent will proceed at a temperature in the range from about room temperature to 100° C. or so. Ordinarily, temperatures below about 60° C. will be used and 30°–50° C. is preferred for most purposes.

The solvents useful in the solution polymerization process for synthesizing the polyamide-acid are inert organic solvents, i.e., solvents whose functional groups do not react with the anhydride monomer to any appreciable extent. Particularly useful are the normally liquid organic solvents of the N,N-dialkylcarboxylamide class. The preferred solvents are the lower molecular weight members of this class, particularly N,N-dimethylformamide and N,N-dimethylacetamide. Other typical compounds of this useful class of solvents are N,N-diethylformamide, N,N-diethylacetamide, N,N-dimethylmethoxy acetamide, N-methyl caprolactam, etc. Other solvents which can be used are dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone and N-acetyl-2-pyrrolidone. The solvents can be used alone, in combinations of solvents, or in combination with other solvents such as benzene, benzonitrile, dioxane, xylene, toluene and cyclohexane.

In an important and related invention, it has been found that the polymerization reaction described above proceeds with greatly increased speed and efficiency when the reaction is carried out in the presence of a catalytic amount of an acid catalyst.

Particularly useful acids include the following:

(1) Organic carboxylic acids of the formula R′—COOH where R′ is selected from the group consisting of hydrogen, alkyl of 1 through 10 carbons, phenyl, haloalkyl and halophenyl where the alkyl portion has 1 through 10 carbons and the halo atoms are chlorine or fluorine. The organic carboxylic acid will have an ionization constant of at least about $10^{-5}$ (2) Organic sulfonic acids of the formula R″—SO₃H where R″ is selected from the group consisting of alkyl of 1 through 10 carbons, phenyl, haloalkyl and halophenyl where the alkyl portion has 1 through 10 carbons and the halo atoms are chlorine or fluorine. The organic sulfonic acid will also have an ionization constant of at least about $10^{-5}$.

(3) Mineral acids which are non-oxidizing toward primary amines and which have at least one ionization constant of at least about $10^{-5}$.

(4) Lewis acids.

Illustrative of such acids are formic acid, acetic acid, propionic acid, capric acid, isobutyric acid, chloroacetic acid, trichloroacetic acid, difluoroacetic acid, benzoic acid, p-toluic acid, m-chlorobenzoic acid, p-fluorobenzoic acid, methanesulfonic acid, benzenesulfonic acid, p-toluenesulfonic acid, p-chlorobenzenesulfonic acid, 2-fluorobenzenesulfonic acid, hydrochloric acid, hydrobromic acid, hydrofluoric acid, sulfuric acid, phosphoric acid, boron trifluoride, aluminum trichloride, antimony pentachloride, phosphorus oxychloride, trifluoroacetic acid, and mixtures of these.

The amount of acid catalyst used can of course vary and will depend, as will be readily understood, upon such things as the particular acid used, the anhydride used, the solvent used, and the nature of the effect desired. The acid strength should be such as will maintain the solubility of the monomer and the growing polymer in the solvent. Ordinarily, when the acid is an organic carboxylic acid or a Lewis acid, from about 0.5 to about 5 moles, and preferably from 2.5 to 3.5 moles, of acid per liter of reaction mass will be used. When the acid is an organic sulfonic acid or a mineral acid, from about 0.1 to about 1.0 mole, and preferably from 0.5 to 0.7 mole, of acid per liter of reaction mass will be used. Optimum amounts of acid for any given situation can readily be determined by persons skilled in this art without undue experimentation.

The polyamide-acids prepared as described above can readily be converted, using techniques described, for example, in Edwards United States Patent No. 3,179,631 issued Apr. 20, 1965, to the corresponding polyimides consisting essentially of recurring units of the formula (2) 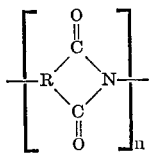

where R and $n$ have the same meaning as above, and the two indicated carbonyl groups are on adjacent carbons of the R radical. These polymers are characterized by their outstanding fabricability, thermal stability and combination of other phyiscal properties which make them particularly useful as film forming agents.

The present invention is illustrated by the following examples in which parts and percentages are by weight unless otherwise indicated.

Example 1

4-aminophthalic anhydride (0.5 gram) was dissolved in 1 milliliter of dry N,N-dimethylacetamide. The viscosity of the solution gradually increased. The solution was held overnight at 40° C. for 7 hours and then at 70° C. for 0.5 hour. The resulting polyamide-acid had an inherent viscosity of 0.29 when measured at 30° C. on a 0.5% by weight solution in N,N-dimethylaceamide. The gel was cast into a thin layer on a plate and the solvent was evaporated at room temperature under vacuum to give a clear polyamide-acid film, convertible to polyimide by known techniques.

Example 2

To 1.90 parts of dry N,N-dimethylacetamide under nitrogen was added 1.00 part of 4-aminophthalic anhydride which had been crystallized three times. The monomer readily dissolved. The solution was frozen at −78° C., placed under vacuum, placed under argon at one atmosphere pressure, melted by warming to room temperature, frozen at −78° C., placed under vacuum, placed under argon at one atmosphere pressure, melted, and heated at 50° C. for 15 hours to form a 34.5% solids solution of poly-4-phthalamic acid (the polyamide-acid derived from 4-aminophthalic anhydride). The inherent viscosity of the polymer was 0.45, measured as a 0.5% by weight solution in N,N-dimethylacetamide at 30° C.

A like reaction carried out for 24 hours reaction time at 50° C. also gave polyamide-acid having an inherent viscosity of 0.45.

Example 3

One gram of 4-aminophthalic anhydride was dissolved in 10 milliliters of a reaction medium, tabulated in Table I. The reaction media were prepared by mixing the acid with the solvent shown. In the case of boron trifluoride, the gas was bubbled into the solvent until the solvent contained 24% by weight BF$_3$. The table shows the molarity of the acid in the solution. The solutions were stirred at 50° C. for 2 hours, and then analyzed by examining the infrared spectrum for disappearance of the anhydride functional group, which disappearance was shown to be indicative of polymer formation by subsequent isolation of polymer. The percent of reaction in the two-hour period was estimated from the infrared spectrum, and is shown in the table.

By way of typical example for isolation of polymer, the reaction in DMAC/BF$_3$ was continued at 25° C. for 18 hours and then at 40° C. for 4 hours. The resulting polymer had an inherent viscosity of 0.31, measured as an 0.5% by weight solution in DMAC containing 0.48% BF$_3$, at 30° C. The polymer solution was cast on a glass plate, and dried overnight at room temperature under vacuum to give a self-supporting film.

TABLE 1

[Polymerization temperature 50° C. unless otherwise indicated. Monomer concentration is 9.3% solids unless otherwise indicated]

| Polymerization [1] medium | Molarity of acid | Percent reaction in two hours |
|---|---|---|
| 70/30 (vol.) DMAC/AA | 5 | 87 |
| P/HBr | 0.4 | 79 |
| DMAC/HBr | 0.5 | 65 |
| 80/20 (vol.) DMAC/DCAA | 1.6 | 56 |
| 70/15/15 (vol.) DMAC/AA/P | 2.3 | 50 |
| 90/10 (vol.) DMAC/AA | 1.7 | 25 |
| DMAC/BF$_3$ (24% by wt.) (20% solids, at 25° C.) | | 30 |
| 70/30 (vol.) DMAC/TEA | | 8 |
| P | | 2 |
| DMAC | | Nil |

[1] Codes for the tables: DMAC—N,N-dimethylacetamide; AA—Acetic acid; P—Pyridine; DCAA—Dichloroacetic acid; TEA—Triethylamine; DCTFAH—Sym-dichlorotetrafluoroacetone hydrate.

Example 4

A series of polymerizations of 4-aminophthalic anhydride was carried out in several reaction media in the same way as in Example 3. In this case, the disappearance of the anhydride functional group was estimated from the infrared spectrum at various time intervals. The data were plotted on graphs (percent reaction vs. reaction time), and the time for 50% reaction was read from the graph. The results are summarized in Table II.

TABLE II

| Polymerization medium | Percent solids | Temperature | Molarity of acid | Time for 50% reaction |
|---|---|---|---|---|
| DMAC | 9.3 | 50 | | 140 hours. |
| DCTFAH | 12 | 45 | | 7 hours. |
| 70/30 (vol.) DMAC/AA | 9.3 | 50 | 5 | 20 minutes. |

Example 5

One gram of 3-aminophthalic anhydride was dissolved in 10 milliliters of 70/30 (vol.) DMAC/acetic acid. The solution was stirred at 50° C. As estimated by the infrared spectrum, 50% reaction had occurred after 230 hours. This reaction is significantly faster than the comparable reaction carried out in DMAC solvent.

Example 6

A solution of 1.5 grams of 4-aminophthalic anhydride in 2.5 milliliters of DMAC (37.5% solids) under nitrogen was stirred at 45° C. for 17.5 hours. The inherent viscosity of the resulting polymer was 0.51, measured as a 0.5% by weight solution in DMAC at 30° C. The polymer solution was cast into a film which was dried under vacuum at room temperature overnight. A transparent, self-supporting film was obtained.

Example 7

4-aminophthalic anhydride was polymerized in various media, at various concentrations, and at different temperatures for various times, as specified in Table III. The inherent viscosity of the resulting polymers is shown in the table, measured as 0.5% by weight solutions at 30° C. in the same medium as used for the polymerization medium.

TABLE III

| Polymerization medium | Wt. percent monomer | Reaction time (hrs.) | Reaction temperature (° C.) | Inherent viscosity of polymer |
|---|---|---|---|---|
| 70/30 (vol.) DMAC/AA | 10 | 16 | 50 | 0.27 |
| 80/20 (vol.) DMAC/AA | 20 | 17 | 40 | 0.37 |
| 76/24 (vol.) DMAC/AA | 24 | 19 | 45 | 0.52 |
| 80/20 (vol.) DMAC/AA | 30 | 45 | 25 | 0.51 |
| DMAC/BF$_3$ (24% by wt.) | 16 | 40 | 25 | 0.35 |
| DCTFAH saturated with BF$_3$ | 16 | 24 | 25 | 0.28 |

The foregoing examples can be repeated, as will be readily understood by persons skilled in this art, by substituting other materials within the indicated scope of this invention for those of the specific exemplications.

It is to be understood that the foregoing detailed de-

The invention claimed is:

1. The process of preparing a polyamide-acid of the AB type consisting essentially of recurring units of the structure

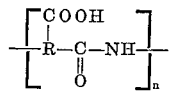

where R is a carbocyclic aromatic nucleus selected from the group consisting of (a) a single carbocyclic aromatic ring, (b) two fused carbocyclic aromatic rings, and substituted (a) and (b) having 1 through 3 substituents selected from the group consisting of fluoralkyl of 1 through 4 carbons, phenyl, chlorine and fluorine, and $n$ is a positive integer sufficient to provide a film forming polymer; said process comprising reacting with itself, in an inert organic solvent and at a temperature in the range of about room temperature up to about 100° C., an amino dicarboxylic acid anhydride having the amino and anhydride groups attached to a nucleus defined the same as R above, for a time sufficient to produce said polyamide-acid.

2. The process as in claim 1 wherein said temperature is in the range of 30° to 50° C.

3. The process as in claim 1 wherein said anhydride is 4-aminophthalic anhydride and the polyamide-acid obtained has an inherent viscoisity of 0.27 to 0.52 measured at 30° C. on an 0.5% by weight solution in N,N-dimethyl acetamide.

4. The process as in claim 1 wherein said anhydride is 3-aminophthalic anhydride.

5. The process of preparing a polyamide-acid of the AB type consisting essentially of recurring units of the structure

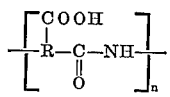

where R is a carbocyclic aromatic nucleus selected from the group consisting of (a) a single carbocyclic aromatic ring, (b) two fused carbocyclic aromatic rings, and substituted (a) and (b) having 1 through 3 substituents selected from the group consisting of fluoroalkyl of 1 through 4 carbons, phenyl, chlorine and fluorine, and $n$ is a positive integer sufficient to provide a film forming polymer; said process comprising reacting with itself, in an inert organic solvent and at a temperature in the range of about room temperature up to about 100° C., an amino dicarboxylic acid anhydride having the amino and anhydride groups attached to a nucleus defined the same as R above, for a time sufficient to produce said polyamide-acid, in the presence of an acid selected from the group consisting of (a) organic carboxylic acids of the formula R′—COOH where R′ is selected from the group consisting of hydrogen, alkyl of 1 through 10 carbons, phenyl, haloalkyl and halophenyl where the alkyl portion has 1 through 10 carbons and the halo atoms are selected from the group consisting of chlorine and fluorine, said organic carboxylic acid having an ionization constant of at least about $10^{-5}$; (b) organic sulfonic acids of the formula [R″—COOH] R″—SO₃H where R″ is selected from the group consisting of alkyl of 1 through 10 carbons, phenyl, haloalkyl and halophenyl where the alkyl portion has 1 through 10 carbons and the halo atoms are selected from the group consisting of chlorine and fluorine, said organic sulfonic acid having an ionization constant of at least about $10^{-5}$; (c) mineral acids which are non-oxidizing toward primary amines and which have an ionization constant of at least about $10^{-5}$; and (d) Lewis acids; said acid being used in an amount of from about 0.5 to 5 moles per liter of reaction mass when said acid is selected from the group consisting of said organic carboxylic acids and said Lewis acids, and from about 0.1 to 1.0 mole per liter of reaction mass when said acid is selected from the group consisting of said organic sulfonic acids and said mineral acids; for a time sufficient to produce said polyamide-acid.

6. The process as in claim 5 wherein said temperature is in the range of 30° to 50° C.

7. The process as in claim 5 wherein said anhydride is 4-aminophthalic anhydride and the polyamide-acid obtained has an inherent viscosity of 0.27 to 0.52 measured at 30° C. on an 0.5% by weight solution in N,N-dimethylacetamide.

8. The process as in claim 5 wherein said anhydride is 3-aminophthalic anhydride.

9. The process as in claim 5 wherein said acid is acetic acid.

10. The process as in claim 5 wherein said acid is sulfuric acid.

References Cited

UNITED STATES PATENTS 3,179,631   4/1965   Endrey _____ 260—78
3,179,633   4/1965   Endrey _____ 260—78

OTHER REFERENCES

Bogert et al., Journal of the American Chemical Society, vol. 30 (1908), pp. 1135–1144.

Brandt, J. Prakt, Chem., vol. 7, Series 4, pp. 163–172 (1958).

HAROLD D. ANDERSON, Primary Examiner.

U.S. Cl. X.R.

117—161; 260—30.2, 30.4, 30.6, 30.8, 31.2, 32.6, 32.8

UNITED STATES PATENT OFFICE
CERTIFICATE OF CORRECTION

Patent No. 3,450,678                             June 17, 1969

Fulton F. Rogers, Jr.

It is certified that error appears in the above identified patent and that said Letters Patent are hereby corrected as shown below:

Column 2, line 30, insert a period (.) after "$10^{-5}$". Column 3, line 3, "N,N-dimethylaceamide" should read -- N, N-dimethylacetamide --; line 38, "crystallized" should read -- recrystallized --. Column 5, line 30, "viscoisity" should read -- viscosity --. Column 6, line 9, please delete "[R"-COOH]".

Signed and sealed this 7th day of October 1969.

(SEAL)
Attest:

Edward M. Fletcher, Jr.                        WILLIAM E. SCHUYLER, JR.
Attesting Officer                                       Commissioner of Patents